(12) United States Patent
Lamour et al.

(10) Patent No.: US 6,264,715 B1
(45) Date of Patent: Jul. 24, 2001

(54) METHOD FOR MAKING SOIL CONDITIONER

(75) Inventors: Brent Lamour, Pouqhguag; Shawn Goff, Stanfordville, both of NY (US)

(73) Assignee: Salem Organic Soils, Inc., Wingdale, NY (US)

( * ) Notice: Subject to any disclaimer, the term of this patent is extended or adjusted under 35 U.S.C. 154(b) by 0 days.

(21) Appl. No.: 09/576,410

(22) Filed: May 22, 2000

(51) Int. Cl.$^7$ ................ C05F 7/00; C05F 11/00

(52) U.S. Cl. .................... 71/21; 71/24; 71/903

(58) Field of Search .................. 71/21, 24, 903

(56) References Cited

U.S. PATENT DOCUMENTS 4,788,790  12/1988  Zeager ........................... 47/9

Primary Examiner—Chhaya D. Sayala
(74) Attorney, Agent, or Firm—Stanley J. Yavner

(57) ABSTRACT

A method of making a landscaping mulch, using as its primary ingredient, spent stable bedding which has its primary ingredient ripe de bois softwood shavings. The result of the method is a mulch, particularly for landscaping applications, having a relatively high pH value, between 6.5 and 7.5, which is also useful for neutralizing the effects of acid rain. The method involves the steps of mixing agricultural manure in the range of 5%–25%, softwood shavings from spent stable bedding in an amount of greater than 60%, and when necessary, to augment carbon-to-nitrogen ratios, other ancillary ingredients in an amount less than 25%; producing a result by the mixing of ingredients, which has a carbon-to-nitrogen range from 100 to 200 parts of carbon to 1 part of nitrogen. Thereafter, the mixed ingredients are used to form piles, which are then over-saturated with water. Thereafter, liquid is percolated through the mixed ingredients, which liquid is expressed from the bottom of the pile by gravity. Thereafter, the pile is resaturated with the expressed liquid, now rich in tannin liquors, in order to provide a natural coloring agent for the material. Then the water flow is halted in order to allow biological activity to generate heat. Heat bakes-in the color and releases more tannins for extraction when liquid saturation is resumed. The foregoing process, beginning with resaturation, is repeated until the desired color is achieved.

6 Claims, 2 Drawing Sheets

METHOD FOR MAKING SOIL CONDITIONER

FIELD OF THE INVENTION

This invention relates to methods for making soil conditioners, and more particularly to a method for coloring and converting of softwoods shavings into a mulch for landscaping applications.

BACKGROUND OF THE INVENTION

In the field of producing mulch for landscaping applications, it is highly desirable to produce a mulch with natural, dark color, and good moisture retention properties. It is known that many commonly produced mulches are artificially dyed to imitate natural colors. The dyes used for artifical coloration are known to shed water and/or inhibit water absorption. Furthermore, many of the dyes and emulsions used to artificially color mulch are known to contain ingredients which may be harmful when handled, or when leached into the soil and environment.

The attempt to produce mulch by artifially dying ingredients also incurs the use of specialty equipment, such as screeners, dryers, and the like. The costs of such equipment ranges upwardly from $60,000 to $200,000 and above. Mulch produced with such dyes, emulsions, and equipment adds as much as $4.20 per cubic yard of finished material.

Additionally, many commercially produced mulches contain undesirable ingredients, such as demolition debris, glass, plastic, creosoted wood, wood containing toxic preservatives, and some soil conditioners even contain sewage waste products.

Additionally, because of the manner in which ingredients are handled and processed, many mulches contain weed seeds which are undesirable in a landscaping product.

A superior mulch and soil conditioner will be produced by a process which uses only natural, organic ingredients, has a natural, permanent dark color, has an attractive texture, has good moisture retention properties, is free of toxic materials, is free of weed seeds, is safe for humans, pets, and other living things, and qualifies in any organic certification program.

The present invention embodies all of the aforementioned virtues in production and in the final product. A commonly used method for producing mulch which most closely resembles this invention, Zeager U.S. Pat. No. 4,788,790, is referred to in order to illustrate the drawbacks of that process and the improvements of this invention. In that patent, Zeager recommends, as an ingredient, 20% bark, preferably oak bark. Also, Zeager states a preferred temperature of 65 degrees to 85 degrees F. (18.3 degrees to 29.3 degrees C.) in order to produce the dark color for the mulch. Furthermore, Zeager finds faster processing in the summertime, and forms piles in long and low rows with a total volume ranging between 2800 and 9400 cubic yards. As may be seen from the foregoing, the bark used by Zeager is, of course, differrent than the combination of manure-softwood shavings recommended in the present invention. Also, the low temperature range used by Zeager is much too low to include biological activity as part of the manufacturing process. The recommendation by Zeager to perform his method in summer, avoids a more efficient processing during lower ambient temperatures with the present invention process. Furthermore, the conical shapes recommended in the present invention process accounts for the difference in the quantity of heat generated, 160 degrees to 200 degrees F. (70 degrees to 93 degrees C.) with the present invention, as compared to 65 degrees to 85 degrees F. (18.3 degrees to 29.3 degrees C.) noted by Zeager. Still further, the use of a crater and concentric troughs in the piles recommended in the present invention process, serves to increase the uniformity of saturation of liquid within the piles and proper compaction of the piles, when compared to the Zeager process. Lastly, the present invention produces a final pH value which is "sweet", and this is beneficial when used with many types of landscaping plantings, whereas the same result is not achieved by Zeager.

OBJECTS AND SUMMARY OF THE INVENTION

Accordingly, a primary object of the present invention is to provide a process for producing mulch which is safe, non-toxic, weed-free, is able to qualify in organic certification programs, and results in mulch which is natural and darker colored for landscaping applications.

A further object of the present invention is to provide a method for producing mulch which is lower in cost for equipment and ingredients than the methods presently available.

A further and more particular object is to provide a method for producing mulch resulting from the use of proper moisture and temperature levels, wherein biological activity is promoted in order to kill weed seeds and bake-in the desired color, which ranges from brown to black.

These and other objects of the invention are featured in a method for producing mulch which utilizes ripe de bois, softwood shavings that have been used as a bedding in horse stables and/or cow barns. Spent bedding ingredients are mixed with approximately 10% to 20% agricultural manure, by volume, so that a carbon-to-nitrogen ratio ranging from 100 to 200 parts carbon to 1 part nitrogen is achieved. Other ancillary ingredients can be used in the mixture, but not to exceed 25% of the volume. Accordingly, the softwood shavings, by volume, constitute at least 60% of the mixture. Piles are formed of the mixed ingredients to achieve maximum compression, saturation, and optimal heat generation. The shapes of the piles are made in the form of cones, with concentric troughs and a crater truncating the top of the cone. The crater is formed so that approximately 25% of the full height of the cone is removed, with a pre-truncation height of 34 to 47 feet. The base diameter of the cone ranges from 68 to 94 feet, and a volume range of 1500 to 4000 cubic yards.

After the piles are formed in such sizes and shapes, they are then over-saturated with water, which then percolates through the mixed ingredients and is expressed from the bottom of the pile by gravity, and pooled. The expressed liquid at the base of the cone, which is now rich in tannin liquors, is used to resaturate the pile and so provides the natural coloring agent for the material. Then, water flow is halted for inherent heat to generate by biological activity in the absence of water flow. The heat bakes-in the color and releases more tannins for extraction when liquid saturation is resumed. The process of resaturation and halting of the water flow to generate heat by biological activity is repeated until the desired color is achieved.

BRIEF DESCRIPTION OF THE DRAWINGS

Other objects, features and advantages of the present invention will become apparent by reference to the following detailed description of the preferred, but nonetheless illustrative, embodiment of the present invention, with reference to the accompaning drawing, wherein.

DETAILED DESCRIPTION OF THE METHOD ACCORDING TO THE PRESENT INVENTION

According to the present invention, spent stable bedding is collected and used to form a mixture, including, by volume, no more than 5%–25% agricultural manure in relation to softwood shavings. Usually the manure will be in the range of 10% to 20%, by volume, but when harvesting agricultural manure from high-profile show barns, manure content may drop below 5%. When agricultural manure content is harvested from other stables the manure content can be as high as 20%–25%, but, in any case, proper mixing with the softwood shavings is essential.

Of the total volume, at least 60% should be ripe de bois softwood shavings, or other softwood chips, plus any other ancillary ingredients, such as soiled cow bedding, grass clippings, spoiled silage or green chop, and agricultural manure if nitrogenous supplements are called for; and straw, sawdust, or any organic woodchip or shaving of homogenous size when carbonaceous materials are called for. This is to achieve a ratio of carbon-to-nitrogen ranging from 100 to 200 parts carbon to 1 part nitrogen.

Figure 1:
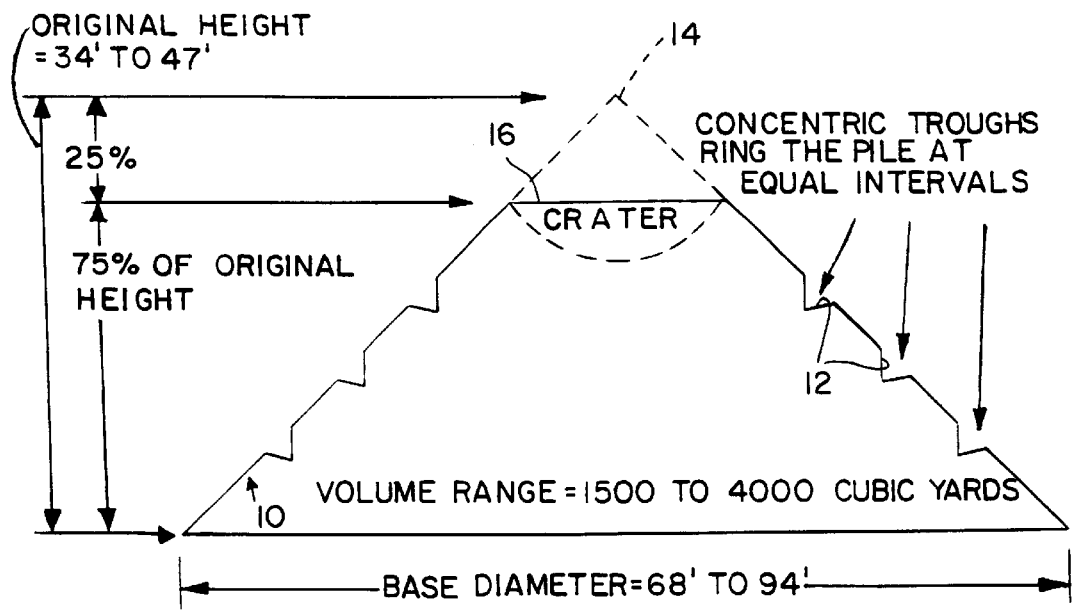
FIG. 1 is a representation of the pile used to place the mixed ingredients, according to the invention method, so that such ingredients may be first over-saturated with water, and which pile has side-wall concentric troughs and a crater at the top thereof to achieve maximum compression, saturation and heat generation according to the present invention method.

The ingredients are well mixed to form that ratio, and thereafter, piles are formed to achieve maximum compression, saturation, and optimal heat generation. Such form for the pile is shown in FIG. 1, generally designated 10, wherein the total volume is shown to range from 1500 to 4000 cubic yards, initially. After the conical pile is formed, crater 16 is then formed at the top of the pile 10, as shown by ghost lines. The rim of this crater should be at approximately 75% of the height of the original pile, with the original height 14 being approximately 34 to 47 feet before the crater is formed. The volume range is adhered to by forming the piles, each with a base diameter of 68 to 94 feet. Depending on the exact constituent ingredients used, and their moisture content at the time of pile formation, the angle of the slope of the cone should optimally be 45 degrees. In forming the piles, if an elevator is used, each pile will have a more uniform shape in comparison to a pile formed by equipment such as a front-end loader or bulldozer. In either case, the proportions of the pile may vary as equipment and location dictate. However, slight variations in the shape of the pile will not reduce the overall effectiveness of the method, according to this invention.

Additionally, concentric troughs 12, ringing the side wall of the pile at regular intervals, allow run-off spilling from the crater at the top to more evenly saturate the pile. The number of concentric troughs may range between three and five depending upon the volume of the pile.

Figure 2:
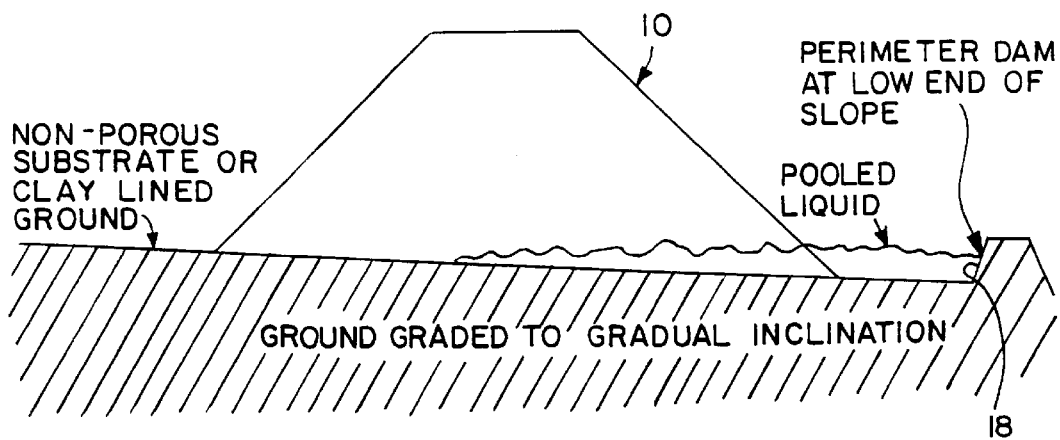
FIG. 2 shows the slightly inclined grade upon which the pile is placed, with a dammed perimeter beyond the bottom edge of the pile for expressing and pooling the liquid resulting from the invention method.

For the purpose of pooling expressed liquids, such piles are formed, each on ground graded to a gradual inclination to a formed perimeter dam at the low end of the slope. The ground should be a non-porous substrate, as indicated in FIG. 2, or, if substrate upon which piles are formed is porous, such ground should be lined with clay or other impervious material. The pooling indicated in FIG. 2 enables the further use of liquid tannins formed by the pile. Additionally, liquid tannins may be stored in a tank, or series of tanks, for subsequent use.

As will be indicated hereinafter, after forming a pile, water or previously saved tannin liquors are pumped onto the pile until complete saturation occurs. In other words, pumping continues beyond saturation, from the liquid that is expressed from the bottom of the pile, until the harvested amount is sufficient to resaturate the pile. It should also be stated that resaturation is best achieved by pumping the pooled tannin liquors back to the top of the pile and filling the crater.

The application of water or available tannin liquors ceases when the pile has become fully saturated. The moisture of the pile slowly reduces and eventually falls through the 70% to 40% range to support biological activity. Temperature is monitored with a probe thermometer until a maximum temperature of 200 degrees F. (93 degrees C.) is achieved. At this temperature, biological activity ceases, and additionally, most weed seeds are killed off. When moisture falls below 40% and/or temperature exceeds 200 degrees F. (93 degrees C.), resaturation begins.

This process of saturation and monitoring should be repeated over and over again until desired coloration is achieved from the recirculation of tannin liquors. To achieve optimum dark brown, or black colors, the pile is mixed and reformed at least once.

Because this is normally an outdoor activity, subject to changes in seasonal temperature and humidity, the time it takes to reach a desired temperature will vary, as will the length of time a pile remains at a particular moisture level. Although the coloring process works throughout the year, experience has shown it works quickest when ambient temperatures are at their lowest, so that less time will be required to achieve desired color. When final desired color is reached, the pile should be either covered or broken down for distribution.

The final saturation of the pile yields the most potent, tannin rich liquids, and as much of this as possible should be harvested and stored to begin the saturation of a new pile.

Figure 3:
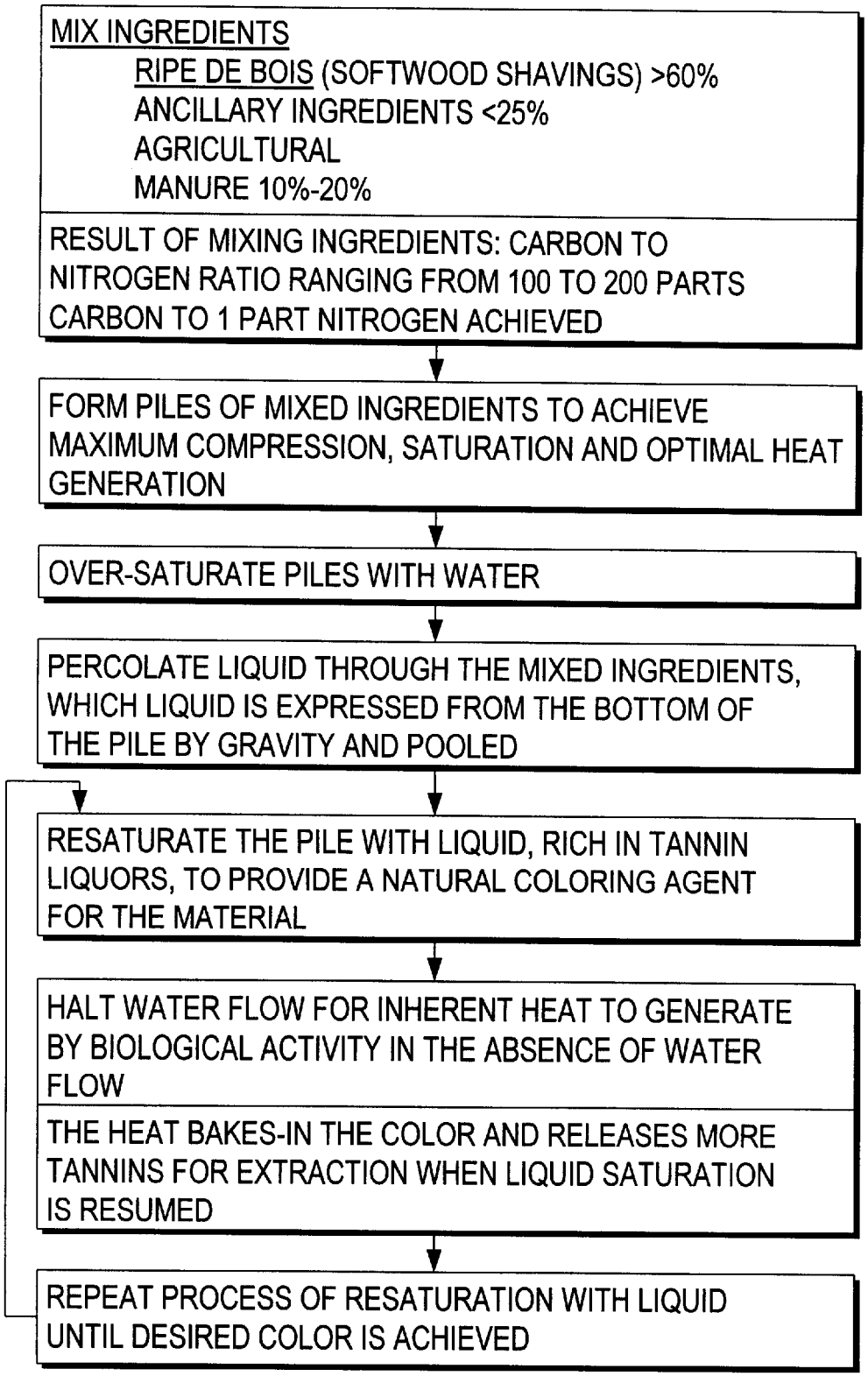
FIG. 3 is a block diagram representing steps of the method according to the present invention.

In order to provide a more complete understanding of the present invention, a series of method steps, and alternatives, will now be provided, with reference particularly to FIG. 3.

Minimally, ripe de bois, in an amount greater than 60%, and agricultural manure are mixed to produce a carbon-to-nitrogen ratio of 100 to 200 parts carbon to 1 part nitrogen. The mixture is then arranged in piles, on a substrate of graded ground, or clay lined ground, as shown in FIGS. 1 and 2. The crater at the top of the piles is filled with water, and indeed, the piles are oversaturated with water, so that liquid percolates through the mixed ingredients to be expressed from the bottom of the pile by gravity, and then pooled against dam 18, as shown in FIG. 2. The pooled liquid, which is rich in tannin liquors, is used to resaturate the pile through the crater 16, in order to color the mixed material. When the desired color is reached, the application of water and tannin liquors ceases with the pile becoming fully saturated. The moisture of the pile slowly reduces, falling through the 70% to 40% range so that biological activity is started. When the temperature of 200 degrees F. (93 degrees C.) is achieved, biological activity ceases, and as moisture falls below 40%, and/or temperature exceeds 200 degrees (93 degrees C.), resaturation begins. During that process, the halt of water flow enables heat generated by biological activity to bake-in the color and release more tannins for extraction when resaturation resumes. The process is repeated until the desired color is achieved.

As an alternative, if the carbon-to-nitrogen ratio is not achieved without ancillary ingredients, such ancillary ingredients, as hereinbefore indicated, are used in an amount less than 25%, by volume, to enable the mixture to achieve the desired ratio.

The foregoing is intended to illustrate the present invention, its alternative embodiments, and the ranges of sizes and amounts as recommended. Such is not intended to limit this invention, which is to be accorded the scope of the following claims:

What is claimed is:

1. A method for making a soil conditioner having a dark color without artificial dyes, comprising the steps of:
    (a) mixing softwood shavings and agricultural manure to provide, after mixing, a material having a carbon-to-nitrogen ratio in the range of 100–200 parts of carbon to one part of nitrogen;
    (b) forming piles of mixed ingredients in the form of truncated cones having cavities at the tops thereof and concentric troughs spaced on the side walls of each of said cones, with each cone having a volume in the range of 1500–4000 cubic yards;
    (c) over-saturating the piles with water so that liquid percolates through the mixed ingredients to be expressed from the bottom of the pile by gravity and to form a pool of liquid, rich in tannin liquors proximate the base of each cone for use in resaturating said cone;
    (d) halting the water flow in each cone enabling the generation of heat in the cone by means of biological activity, said heat baking-in the color of the pile; and
    (e) the piles thereby releasing more tannins for extraction as said resaturation is resumed, with the process of resaturation being repeated until desired dark color is achieved.

2. The method according to claim 1 wherein said mixing is accomplished using softwood shavings in an amount by volume of at least 60%.

3. The method according to claim 2 wherein said mixing is accomplished using agricultural manure in an amount by volume of no more than 25%.

4. The method according to claim 1 wherein dams are provided proximate the base of said cones for enabling the pooling of liquid expressed from the bottom of the pile.

5. The method according to claim 3 wherein ancillary ingredients selected from the following are used for said mixing: soiled cow bedding, grass clippings, spoiled silage and/or green chop, if nitrogenous supplements are required to provide said ratio.

6. The method according to claim 3 wherein ancillary ingredients selected from the following are used for said mixing: straw, sawdust, and/or any organic wood chip or shaving of homogenous size, if carbonaceous materials are required for said ratio.

* * * * *